Dec. 16, 1947.  A. R. LOCKE  2,432,529
ARC WELDER CONTROL CIRCUIT
Filed Aug. 28, 1943  2 Sheets—Sheet 2

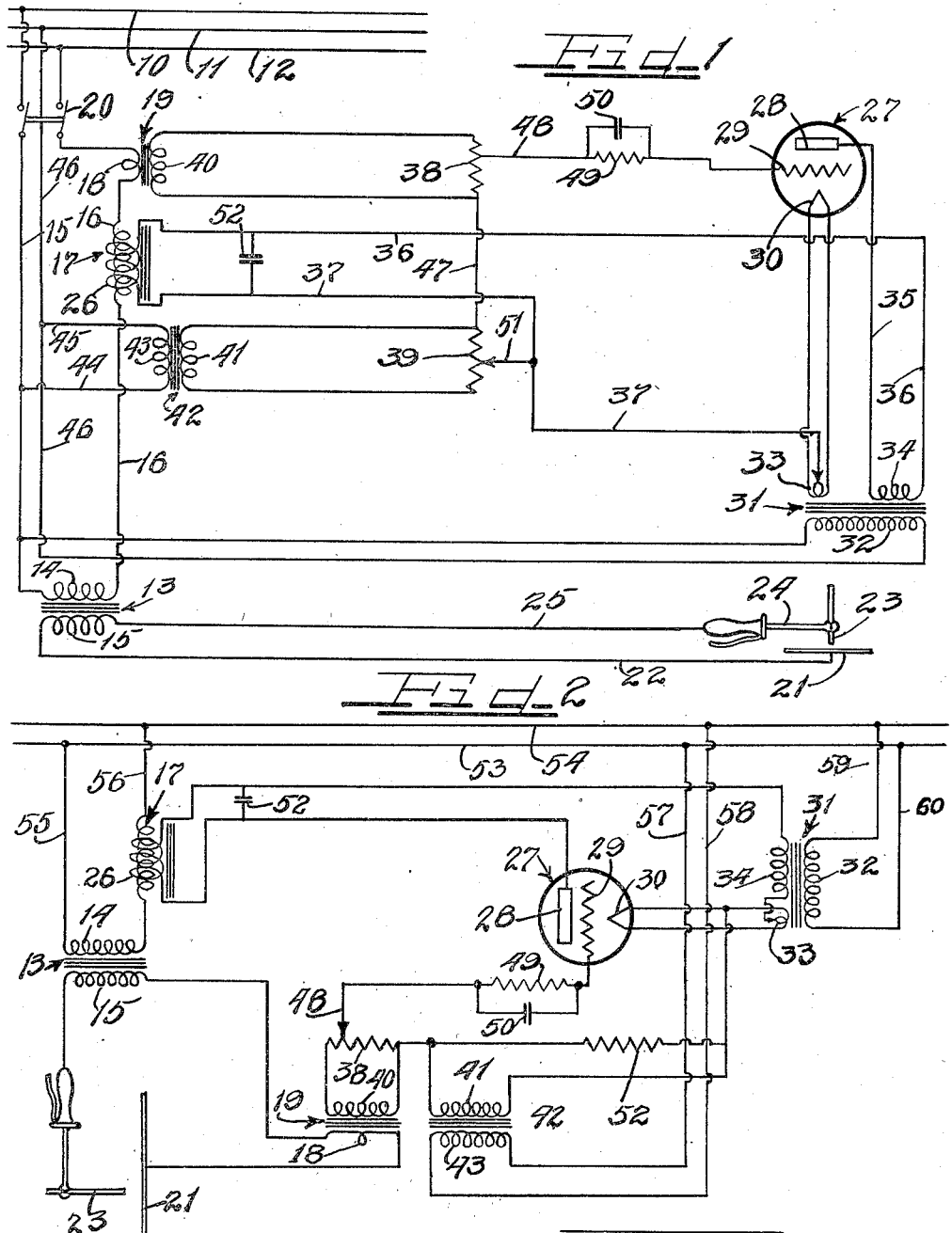

Inventor
Albert R. Locke.
By

Patented Dec. 16, 1947

2,432,529

UNITED STATES PATENT OFFICE 2,432,529

ARC WELDER CONTROL CIRCUIT

Albert R. Locke, Oak Park, Ill.

Application August 28, 1943, Serial No. 500,317

7 Claims. (Cl. 315—284)

This invention relates to an arc welder control circuit and more particularly to a control circuit for an electric arc welding unit having automatic means for maintaining substantially uniform current flow in the arc irrespective of variations in the length of the arc caused by unsteadiness of the operator's hand and also means for preventing an excessively heavy inrush of current when the electrode is first placed into contact with the mandrel.

In electric arc welding apparatus where alternating current is employed, considerable difficulty is experienced in striking the arc and maintaining it without interruption and as a general rule considerable experience and skill is necessary to the successful carrying out of the operation. The arc will not be maintained until the spot on the metal to be repaired has been well heated by the electrical energy expended at the point of contact. After the arc is struck it is maintained at a length of about ⅛ of an inch by careful manipulation on the part of the operator, and if it is drawn out much beyond that length the accompanying decrease in current, due to the increase of resistance in the arc, tends to extinguish the arc. When a welder is using apparatus of the type known prior to the present invention he is constantly trying to strike the arc which frequently goes out and as a result only globules of the electrode metal are deposited on the work surface, and no homogeneous union is made.

One of the principal features and objects of the present invention is to provide an automatic control circuit for electric welding apparatus which greatly lessens the degree of experience and skill necessary in order to carry out a successful welding operation.

Another object of the present invention is to provide a novel control circuit for an alternating current electric welder in which the current flowing in the arc is maintained substantially constant irrespective of changes in resistance of the arc brought about by variations in the length of the arc.

A further object of the present invention is to provide a novel arc welder control circuit including automatic means for placing a relatively large inductive reaction in the power circuit when the arc is first being struck.

Another and further object of the present invention is to provide a novel control circuit for an alternating current arc welder having an inductive reaction in the power circuit whose inductive value is automatically varied upon changes of the resistance value of the arc.

Another and still further object of the present invention is to provide a novel control circuit for an alternating current arc welding machine in which a saturable core reactor is provided in the power supply circuit and in which the saturating winding of the saturable core reactor is supplied with current whose value varies as a function of the line current in the power supply circuit.

The novel features which I believe to be characteristic of my invention are set forth with particularity in the appended claims. My invention itself, however, both as to its manner of construction and method of operation, together with further objects and advantages thereof, may best be understood by reference to the following description, taken in connection with the accompanying drawings, in which:

Figure 1 is a schematic wiring diagram of a control circuit for an alternating current arc welding device and which embodies the novel features and principles of the present invention;

Figure 2 is a schematic wiring diagram of a modified form of the present invention.

Figure 3:
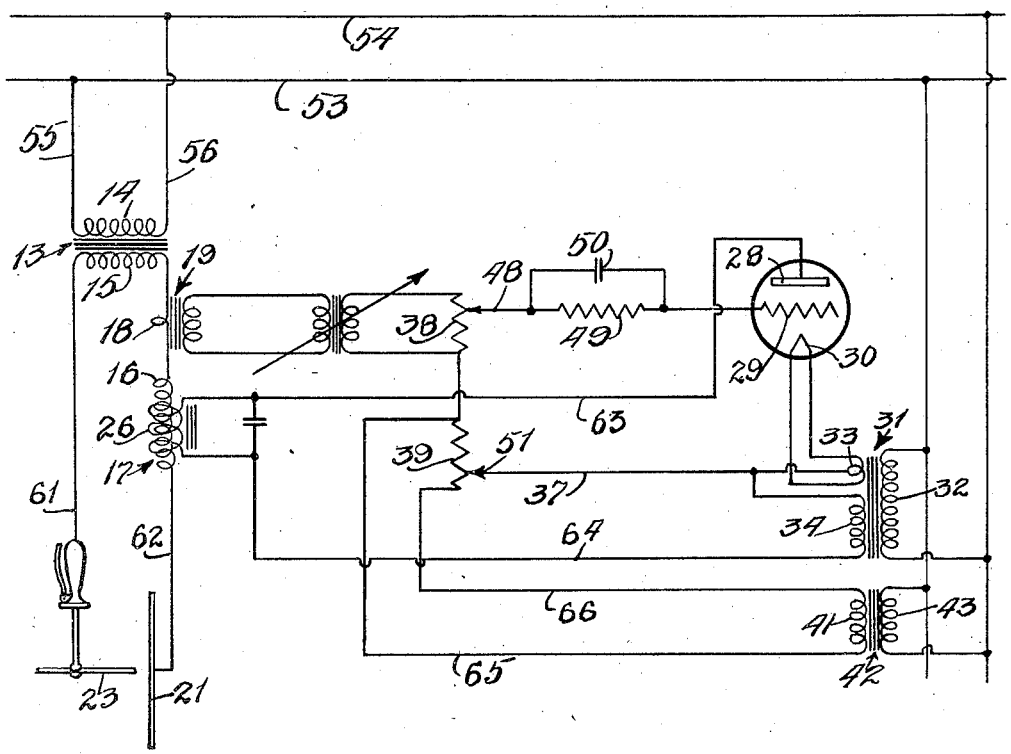
Figure 3 is a schematic wiring diagram of a third embodiment of the present invention.

Referring now to Figure 1 there is illustrated therein a three-wire single phase alternating current power supply line having three conductors 10, 11 and 12. The outer conductors 10 and 12 are connected to a power transformer 13 having a primary winding 14 and a secondary winding 15. One side of the primary winding 14 is connected to power supply line 10 through a conductor 8 and the other end of the primary winding 14 is connected through a conductor 9, the main winding 16 of a saturable core reactor 17 and the primary winding 18 of a current transformer 19 to the power supply conductor 12. A switch 20 is preferably interposed in this circuit as shown.

One end of the secondary winding 15 of the transformer 13 is connected to the work piece 21 through a conductor 22 while the other end of the secondary winding 15 is connected to the electrode 23 held in an electrode holder 24 through a conductor 25.

The saturable core reactor 17 is provided with a control winding 26 which is arranged to be supplied with unidirectional current from an electron discharge device 27 (here illustrated as a triode). The electron discharge device 27 includes an anode 28, a control grid 29 and a heating filament and cathode 30. The electron discharge device 27 is energized from a small control circuit transformer 31 having a primary winding 32 and a pair of secondary windings 33 and 34. The secondary winding 33 is the filament heating winding and is directly connected to the filament 30. The secondary winding 34 has one end directly connected to the anode 28 of the electron discharge device 27 through a conductor 35 while the other end of the winding 34 is connected through a conductor 36 to one end of the control winding 26 of the saturable core reactor 17. The opposite end of the control winding 26 of the saturable core reactor 17 is connected through a conductor 37 to the midpoint of the secondary winding 33. From the above description it will be apparent that an alternating potential wave is impressed across the anode and cathode of the electron discharge device 27.

The manner in which the biasing potential is supplied to the control grid 29 of the electron discharge device 27 is one of the principal features of the present invention. To this end a pair of voltage divider resistors 38 and 39 are provided. The voltage divider resistor 38 is connected across the secondary winding 40 of the current transformer 19. The voltage divider element 39 is connected across the secondary 41 of a transformer 42. The primary 43 of the transformer 42 has one end connected through a conductor 44 to conductor 15. The other end of the secondary winding 43 is connected through a conductor 45 to a conductor 46 which is directly connected to the power supply conductor 11 (which, of course, is the grounded neutral). It will thus be observed that the primary winding 43 is connected to the same source of power as is the primary winding 32 of the transformer 31.

The two voltage divider resistors 38 and 39 are connected together by a conductor 47 as shown. The voltage divider element 38 has a movable contact 48 which is connected through a grid resistor 49 to the control grid 29 of the electron discharge device 27. A by-pass condenser 50 is shunted across the grid resistor 49. It will be understood that the grid resistor 49 is of the type commonly referred to as a grid leak and limits the amount of current flowing in the grid circuit.

The voltage divider element 39 is provided with a movable contact 51 which is directly connected to the conductor 37 and hence to the cathode 30 of the electron discharge device.

A condenser 52 is also preferably connected in shunt across the co-winding 26 of the saturable core reactor 17 to keep alternating current out of this control winding. The functional operation of the circuit illustrated in Figure 1 will now be described. The secondary windings 34, 40 and 41 of the transformers 31, 19 and 42 respectively are wound and connected in such a manner that at an instant of time when the positive potential is impressed on the anode 28 of the electron discharge device 27 with respect to the cathode 30, the lower end of the voltage divider element 38 is positive and the upper end of the voltage divider element 39 is positive but it will be seen that at any given instant of time current is flowing through the two voltage divider elements 38 and 39 in opposite directions. More specifically, when current is flowing upwardly in the voltage divider resistor 38 current is flowing downwardly in the voltage divider resistor 39. Similarly when current is flowing downwardly in the voltage divider resistor 38 current is flowing upwardly in the voltage divider resistor 39. At the instant of time when the latter case is true, the anode 28 of the electron discharge device 27 is negative with respect to the cathode 30.

When switch 20 is closed there is always a current flowing through the voltage divider resistor 39 and hence there is always a voltage drop across this resistor. This is not true, however, of the voltage divider 38 for no current flows in the circuit of the voltage divider resistor 38 and secondary winding 40 of the current transformer 19 unless current is flowing in the primary winding 14 of the power transformer 13 for unless the latter is true there is no current flowing in the primary winding 18 of the current transformer 19. In this connection it must be noted that for purposes of simplicity of description the charging current flowing in the circuit which includes the primary windings 18 and 14 has been neglected. In actual practice and under actual operating conditions there will, of course, always be at least a small current flowing in this circuit whenever switch 20 is closed due to the charging current flowing through the primary winding 14 of transformer 13.

From the above description it will be apparent that there is an alternating potential impressed across the control grid 29 and the cathode 30 at the same time that an alternating potential is impressed across the anode 28 and the cathode 30 of the electron discharge device 27. The amplitude of the alternating potential impressed across the control grid and the cathode 30, however, will vary depending upon the current flowing through the primary winding 18 of the current transformer 19. Let it be assumed that the voltage drop across the voltage divider element 39 is such that when no appreciable current is flowing in the secondary winding 40 of the current transformer 19 a positive potential will be impressed on the control grid 29 at the same time that a positive potential is impressed on the anode 28. Under this condition current will flow in the anode cathode circuit of the electron discharge device 27 and thus results in unidirectional current being supplied to the control winding 26 of the saturable core reactor 17. This saturates the core of the saturable core reactor and reduces the value of inductance placed in the main power circuit by the principal winding 16 of the saturable core reactor 17.

When a large current flows through the primary winding 18 of the current transformer 19 there is a substantial voltage drop across the voltage divider resistor 38. Since the flow of current through this voltage divider resistor 38 is opposite from the current flow through the voltage divider resistor 39 the potentials buck each other. When there is a large voltage drop across the voltage divider resistor 38 the net result is that a negative potential is impressed on the control grid 29 at the same time that a positive potential is impressed on the anode 29 and this cuts down or completely blocks the flow of current in the anode cathode circuit of the discharge device 27.

By suitably adjusting the position of the movable contact elements 48 and 51 a condition may be obtained where the line current flowing through the primary windings 18 and 14 of transformers 19 and 13 respectively is kept substantially constant irrespective of variations in resistance of the arc brought about by change of spacing in the electrode 23 from the work piece 21. This will be understood from the following consideration. When the resistance of the arc is incident (that is when no arc exists between the electrode 23 and work piece 21 and the spacing between the same is great) the only line current flowing through the primary power supply circuit (primary winding 14 of transformer 13) is the charging current and hence only a very low or negligible voltage drop occurs across the voltage divider resistor 38. For that reason, whenever a positive potential appears on the anode 28 the bias on the control grid 29 is such as to permit the maximum flow of current in the anode cathode circuit of the electron discharge device 27. Maximum flow of current in the anode cathode circuit causes maximum current to flow through the control windings 26 and hence the principal winding 16 of the saturable core reactor 17 has its minimum inductive value.

When the resistance of the arc is zero, or in other words, when the electrode 23 is brought into direct contact with the work piece 21 a substantially short circuit condition exists across the secondary winding 15 of the power transformer 13. Under such circumstances there tends to be a heavy inrush of current in the main power supply circuit including the primary winding 14 of transformer 13 and this results in a large voltage drop across the voltage divider resistor 38. This impresses a large negative bias on the control grid 29 whenever a positive bias appears on the anode 28. This, of course, is due to the fact that the voltage drop between the lower end of the voltage divider resistor 38 and the movable contact 48 is much greater than he voltage drop between the upper end of the voltage divider resistor 39 and the movable contact 51. The net result is thus negative and accordingly a negative bias is placed on the control grid 29. This prevents the flow of current through the electron discharge device 27 at a time when the anode 28 is positive with respect to the cathode 30. Of course when the anode is negative with respect to the cathode 30 no current will flow in the anode cathode circuit irrespective of the nature of the potential on the control grid 29. Since no current flows in the anode cathode circuit no unidirectional current flows in the control winding 26 and accordingly the principal winding 16 of the saturable core reactor 17 has its maximum inductive value. This cuts down the flow of current in the welding circuit 25, 22 since the voltage drop across the primary winding 14 of the transformer 13 is materially cut down.

Let us now consider the situation when an arc exists between the work piece 21 and the electrode 23. If the resistance of the arc increases such as by increasing the spacing between the electrode 23 and the work piece 21 the inductive value of the winding 16 should be decreased in order that a greater potential drop will appear across the arc, it being remembered that the desirable condition is to maintain the current in the arc constant. Now when the resistance of the arc increases the line current starts to drop. When the line current starts to drop the voltage across the secondary winding of the current transformer 19 starts to drop and hence the voltage drop across the voltage divider resistor 38 starts to drop. As this latter resistance starts to drop the negative bias on the control grid 29 during the positive half cycles impressed on the anode 28 becomes less and hence more current flows in the anode cathode circuit of the electron discharge device 27. This increases the saturation of the saturable core reactor which in turn decreases the inductive reactance of the principal winding 16. But a decrease in the inductive reactance of the principal winding 16 causes an increase in the line current and thus the line current is brought back to its original value provided that the adjustable contacts 48 and 51 were properly set in advance.

Similarly if the resistance of the arc decreases line current starts to increase, the voltage drop across the voltage divider resistor 38 starts to increase, the negative bias on the control grid 29 starts to become more negative and less current is supplied through the control winding 26 of the saturable core reactor 17. This causes a decrease in the saturation of the saturable core reactor and accordingly the inductive reactance of the winding 16 increases. This in turn produces a smaller voltage drop across the primary windings of the transformer 13 which in turn cuts down the voltage drop across the arc, thus resulting in maintaining a constant current flow in the arc notwithstanding the fact that the resistance of the arc was decreased by moving the electrode 23 closer to the work piece 21.

From the above description it will be apparent that by properly balancing the adjustment of the movable contacts 48 and 51 the line current in the welder circuit 25, 22 may be caused to remain constant irrespective of the variations in the resistance value of the arc.

The modification of the invention illustrated in Figure 2 of the drawing is quite similar to the form of the invention illustrated in Figure 1 with the exception that the current transformer 19 is located in the secondary circuit of the transformer 13 rather than in the primary circuit. For the purpose of ready comparison, the elements in the circuit of Figure 2 which are similar to the elements in the circuit of Figure 1 have been given the same reference numerals. More particularly, the saturable core reactor 17 is connected in the circuit of the primary winding 14 of the power transformer 13. The primary winding 18 of the current transformer 19 is connected in the circuit of the secondary winding 15 of the power transformer 13 and hence has the actual current flowing through the arc between the electrode 23 and the work piece 21 flowing therethrough. The voltage divider resistor 38 is connected across the secondary winding 40 of the current transformer 19 in the same manner as that described in connection with Figure 1. In the place of the voltage divider resistor 39 of Figure 1, however, a fixed resistor 52 is connected across the secondary winding 41 of the voltage transformer 42.

The entire apparatus in this case is connected to a two-wire single phase power transmission line 53 and 54 rather than to a three-wire single phase line as described in connection with Figure 1. More particularly the secondary winding 14 of the power transformer is connected on one side to the power supply line 53 through a conductor 55 while it is connected on the other side through the saturable core reactor 17 and a conductor 56 to the power supply conductor 54. The primary winding 43 of the voltage transformer 42 is connected to the power supply lines 53, 54 through conductors 57 and 58. The primary winding 32 of the transformer 31 is connected to the supply lines 53, 54 through conductors 59 and 60.

While the electron discharge device 27 and the control winding 26 are connected in series across the secondary winding 34 of the transformer 31, it will be noted that in the form of the invention shown in Figure 2 the control winding 36 is in the anode side of the circuit rather than in the cathode side of the circuit as shown in Figure 1. The cathode heating winding 33 is similar to that shown in Figure 1.

The operation of the control circuit shown in Figure 2 is similar to that shown in Figure 1 with the exception that the variable bucking potential for the control grid 29 of the electron discharge device 27 is directly responsive to the current actually flowing in the welding circuit rather than to the current flowing in the primary circuit of the power transformer 13. It has been found that by selecting a proper value for the resistor 52 that only a single adjustable element 48 need be provided to obtain the desired initial control setting.

It will be remembered that the form of the invention shown in Figures 1 and 2 of the drawings employs a biasing potential on the control grid 29 of the electron discharge device 27 which is either in phase with the alternating potential applied across the anode and cathode of the electron discharge device or else 180° out of phase therewith depending on whether the bucking voltage set up on the voltage divider resistor 38 is less than or greater than the voltage set up on the voltage divider resistor 39 (Figure 1) or the load resistor 52 (Figure 2). It has been found that under certain operating conditions a more satisfactory adjustment may be obtained and the line voltage in the welder circuit maintained more nearly constant if a phase adjustment is made between the biasing potential on the grid 29 with respect to the alternating potential applied across the anode and cathode of the electron discharge device 27. Such an arrangement is shown in the embodiment of the invention shown in Figure 3 of the drawing. More particularly there is shown in Figure 3 a power supply line 53, 54 to which the primary winding 14 of the power transformer 13 is connected to conductors 55 and 56. The electrode 23 is connected to one side of the secondary winding 15 of the power transformer 13 through a conductor 61. The work piece 21 is connected to the other side of the secondary winding 15 through a conductor 62, the principal winding 16 of the saturable core reactor 17, and the primary winding 18 of the current transformer 19. The secondary winding 26 of the saturable core reactor 17 is connected in series with the electron discharge device 27 to the secondary winding 34 of the transformer 31. In the form of the invention shown in Figure 3 it will be noted that the control winding 26 is in the anode side of the circuit of the electron discharge device 27, it being connected thereto through a conductor 63. The other side of the control winding 26 is connected through a conductor 64 to one end of the secondary winding 34 of the transformer 31. The other end of the secondary winding 34 is connected to the filament and cathode 30 of the electron discharge device 27. The voltage divider resistor 39 is energized from the secondary 41 of the transformer 42 through conductors 65 and 66. The cathode 30 of the electron discharge device 27 is connected through the movable contact element 51 of the voltage divider resistor 39 through a conductor 37.

The current transformer 19 is arranged to supply an alternating potential across the voltage divider resistor 38 in the manner described in connection with Figure 1 with the exception that in this instance a phase shifting means 67 is interposed in the circuit. The phase shifting means 67 may be of any convenient and suitable type well known to those skilled in the art, it being simply necessary to provide means for shifting the phase of the alternating current supplied to the voltage divider resistor 38 and that such shiftable means be conveniently adjustable. It will be understood that this phase shifting device 67 shifts the phase of the voltage wave supplied across the voltage divider resistor 38 with respect to the voltage wave which is impressed across the anode 28 and cathode 30 of the electron discharge device 27 as well as with respect to the voltage wave which is impressed across the voltage divider resistor 39. A grid biasing potential on the grid 29 of the electron discharge device 27 is now the algebraic sum of the voltage waves appearing between movable contact 48 and movable contact 51.

Of course it will be understood that in usual operation the phase adjustment made by the phase shifting device 67 will be relatively small and that the bucking voltage set up across the voltage divider resistor 38 with respect to the voltage set up across the voltage divider resistor 39 will still operate in substantially the same manner as that described in connection with the operation of the circuit in Figure 1.

From the above description of the three embodiments of the present invention it will be understood that I have provided a novel control circuit for an alternating current arc welder in which the current flowing in the arc may be maintained substantially constant or at least maintained within relatively close limits of variation. It will further be understood that such control will greatly assist the operator in providing a satisfactory welding job and enables a person with considerably less skill than heretofore thought necessary to carry out the operation. It will also be understood that by providing a saturable core reactor in the power circuit of the welding apparatus that excessive initial surges of current when the arc is being struck are kept down to a great extent so that danger to the work piece and to the welding circuit is substantially reduced.

While I have shown and described certain particular embodiments of my invention, it will, of course, be understood that I do not wish to be limited thereto, since many modifications may be made, and I, therefore, contemplate by the appended claims to cover all such modifications as fall within the true spirit and scope of my invention.

I claim as my invention:

1. An arc welder control circuit comprising a load circuit including means for establishing and maintaining an electric arc, said load circuit being arranged to be connected to a source of alternating current, a saturable core reactor having a main winding and a control winding, said main winding being connected in said load circuit, means for supplying uni-directional current to said control winding, and automatic means for varying the value of the uni-directional current supplied to said control winding as a function of the variation in resistance of the electric arc.

2. An arc welder control circuit comprising a load circuit including means for establishing and maintaining an electric arc, said load circuit being arranged to be connected to a source of alternating current, a saturable core reactor having a main winding and a control winding, said main winding being connected in said load circuit, means for supplying uni-directional current to said control winding, and means for increasing the value of the uni-directional current supplied to said control winding in response to an increase of the resistance of the electric arc to decrease the effective resistance of said reactor by an amount substantially equal to the increase in the resistance of said arc, whereby the amount of current flowing through said arc is maintained substantially constant irrespective of variations in the length of said arc.

3. An arc welder control circuit comprising a load circuit including means for establishing and maintaining an electric arc, said load circuit being arranged to be connected to a source of alternating current, a saturable core reactor connected in series in said load circuit, said reactor having a saturating coil, a current transformer having a primary and a secondary, said primary being connected in series in said load circuit, an electron discharge device having an anode, a control grid and a cathode, means for impressing an alternating potential across said anode and cathode, said anode and cathode also being connected to said saturating coil, means for impressing an alternating voltage across said control grid and said cathode, which alternating voltage is substantially in phase with respect to the alternating voltage impressed across said anode and said cathode, said secondary of said current transformer being connected in opposition to said alternating voltage impressed across said grid and said cathode.

4. An arc welder control circuit comprising a load circuit including means for establishing and maintaining an electric arc, said load circuit being arranged to be connected to a source of alternating current, a saturable core reactor connected in series in said load circuit, said reactor having a saturating coil, a current transformer having a primary and a secondary, said primary being connected in series in said load circuit, an electron discharge device having an anode, a control grid and a cathode, means for impressing an alternating potential across said anode and cathode, said anode and cathode also being connected to said saturating coil, means for impressing an alternating voltage across said control grid and said cathode, which alternating voltage is substantially in phase with respect to the alternating voltage impressed across said anode and said cathode, said secondary of said current transformer being connected in opposition to said alternating voltage impressed across said grid and said cathode, and means for shifting the phase of the alternating voltage impressed across the control grid of the cathode with respect to the alternating potential impressed across the anode and the cathode.

5. An arc welder control circuit comprising a welding electrode circuit including a welding electrode and means arranged to be connected to the object to be welded from a power transformer having a secondary connected to said welding circuit to supply power thereto, power supply conductors arranged to be connected to a source of alternating current, saturable core reactor having a load winding and a control winding, a current transformer, the primary of said power transformer, said reactor load winding and the primary of said current transformer being connected in series across said supply conductors, a pair of transformers connected across said supply conductors for supplying control voltages of predetermined magnitude, an electron discharge device having an anode, a cathode and a control grid, the anode and cathode of said electron discharge device being connected in series with the control winding of said saturable core reactor across the secondary winding of one of said control voltage transformers, a voltage divider connected across the secondary of the other control voltage transformer, a second voltage divider connected across the secondary of said current transformer, each of said voltage dividers having a movable contact, the movable contact on the voltage divider connected across said other of said control voltage transformers being connected to the cathode of said electron discharge device, a grid leak resistor, the movable contact of said voltage divider connected across the secondary of said current transformer being connected through said grid leak resistor to the control grid of said electron discharge device, one end of each of said voltage dividers being connected together in such a manner that the voltage waves impressed across the two voltage dividers are 180° out of phase with respect to each other, the voltage divider resistors also being connected in such a manner that the voltage wave impressed across the grid and cathode by the first voltage divider is substantially in phase with the voltage wave impressed across the anode and the cathode of said electron discharge device, whereby the rectified current flowing through the control winding of said saturable core reactor varies inversely with respect to the current flowing in said welding electrode circuit.

6. An arc welder control comprising a welding electrode circuit including a welding electrode and means arranged to be connected to the object to be welded, a power transformer having its secondary connected to said welding electrode circuit to supply power thereto, power supply conductors arranged to be connected to a source of alternating current, a saturable core reactor having an inductance element connected in series with the primary of said power transformer across said supply conductors, an electron discharge device having an anode, a cathode and a control grid, a current transformer connected in said welding electrode circuit and having a voltage divider connected across its secondary, a grid leak, said voltage divider having a movable contact connected through said grid leak to said grid, a resistor having one end connected to one end of said voltage divider and the other end connected to said cathode, said saturable core reactor having a saturating coil, a bypass condenser connected across said saturating coil, means for impressing an alternating potential across said anode and cathode through said condenser, means for impressing an alternating potential across said resistor in phase with that impressed across said anode and cathode, the voltage impressed across said voltage divider being arranged to buck the voltage impressed across said resistor, whereby the value of rectified current flowing through said electron discharge device and said saturating winding varies inversely with the current flowing in said welding electrode circuit.

7. An arc welder control comprising a welding electrode circuit including a welding electrode and means arranged to be connected to the object to be welded, a power transformer having its secondary connected to said welding electrode circuit to supply power thereto, power supply conductors arranged to be connected to a source of alternating current, a saturable core reactor and a current transformer connected in series in said welding electrode circuit, an electron discharge device having an anode, a cathode and a control grid, phase changing means and a resistor connected to the output of said current transformer, a grid circuit connecting said control grid to one portion of said resistor, a second resistor connected at one end to a point on said first resistor remote from said grid circuit connection, said cathode being connected to a point on said second resistor remote from the point at which it is connected to said first resistor, said saturable core reactor having a saturating coil, a bypass condenser connected across said saturating coil, means for impressing an alternating potential across said anode and cathode through said condenser, means for impressing an alternating potential across said second resistor substantially in phase with the alternating potential impressed across said anode and cathode, the voltage impressed across said first resistor being generally in phase opposition to the voltage impressed across said second resistor, whereby the value of rectified current flowing through said electron discharge device and said saturating winding varies inversely with the current flowing in said welding electrode circuit.

ALBERT R. LOCKE.

REFERENCES CITED

The following references are of record in the file of this patent:

UNITED STATES PATENTS

| Number | Name | Date |
|---|---|---|
| 2,009,787 | Rypinski | July 30, 1935 |
| 1,904,485 | Livingston | Apr. 18, 1933 |
| 1,986,622 | Case | Jan. 1, 1935 |